United States Patent
Willis et al.

(10) Patent No.: US 11,726,010 B2
(45) Date of Patent: Aug. 15, 2023

(54) ROTARY DOSING DEVICE

(71) Applicant: Leco Corporation, St. Joseph, MI (US)

(72) Inventors: Peter M. Willis, Benton Harbor, MI (US); Bradley R. Rush, St. Joseph, MI (US)

(73) Assignee: Leco Corporation, St. Joseph, MI (US)

( * ) Notice: Subject to any disclaimer, the term of this patent is extended or adjusted under 35 U.S.C. 154(b) by 24 days.

(21) Appl. No.: 17/335,540

(22) Filed: Jun. 1, 2021

(65) Prior Publication Data

US 2021/0372888 A1    Dec. 2, 2021

Related U.S. Application Data

(60) Provisional application No. 62/704,876, filed on Jun. 1, 2020.

(51) Int. Cl.
| | |
|---|---|
| *G01N 1/22* | (2006.01) |
| *G01N 31/12* | (2006.01) |
| *G01N 35/10* | (2006.01) |

(52) U.S. Cl.
CPC .......... *G01N 1/2247* (2013.01); *G01N 31/12* (2013.01); *G01N 35/1097* (2013.01)

(58) Field of Classification Search
CPC ... G01N 1/2247; G01N 31/12; G01N 35/1097
USPC ......... 73/23.2, 23.41, 23.42, 863.73, 864.83; 137/154, 174, 625.21, 595
See application file for complete search history.

(56) References Cited

U.S. PATENT DOCUMENTS

| | | | |
|---|---|---|---|
| 2,973,117 A * | 2/1961 | Conklin | G01N 30/20 222/362 |
| 6,676,387 B1 | 1/2004 | Penn | |
| 6,843,103 B2 | 1/2005 | Aguilera et al. | |
| 7,823,468 B2 * | 11/2010 | Davison | G01N 30/20 73/863.73 |
| 2022/0178843 A1 * | 6/2022 | Kijima | G06T 7/73 |

FOREIGN PATENT DOCUMENTS

| | | | |
|---|---|---|---|
| JP | S608859 | * | 1/1985 |
| JP | S608859 U | | 1/1985 |
| JP | 2014085209 A | | 5/2014 |
| SU | 769396 A1 | | 10/1980 |
| SU | 1013762 A | | 4/1983 |

* cited by examiner

*Primary Examiner* — Robert R Raevis
(74) *Attorney, Agent, or Firm* — Price Heneveld LLP (57) ABSTRACT

A rotary dosing device for use in analytical instrumentation quickly transfers a sequence of precise molar quantities of gas from a primary stream into a secondary stream. The device has a rotating chamber with dosing ports that cycle through three states: fill, equilibrate, and transfer. The device cycles in an overlapping manner such that as one dose volume fills with gas from the primary stream, another equilibrates at a known pressure and temperature, and another transfers its contents to the secondary stream. The device initiates its operation so that the first transfer in a sequence is a properly filled and equilibrated dose from the primary stream. Rather than cycling a single dose volume through the three states multiple times, the overlapping operation of the rotary doser enables multiple precise molar quantities of gas to be transferred in one-third the time.

21 Claims, 9 Drawing Sheets

ROTARY DOSING DEVICE

CROSS-REFERENCE TO RELATED APPLICATION

This application claims priority under 35 U.S.C. § 119(e) upon U.S. Provisional Patent Application No. 62/704,876, entitled "ROTARY DOSING DEVICE" filed on Jun. 1, 2020, by Peter M. Willis and Bradley R. Rush, the entire disclosure of which is incorporated herein by reference.

BACKGROUND OF THE INVENTION

The present invention relates to a dosing device for transferring precise molar quantities of gas and particularly a dosing device for use in an elemental analyzer.

The determination of elements, such as carbon, hydrogen, and nitrogen, in an organic material is desirable for numerous reasons. In recent years, the food market has become interested in determining the amount of protein in a sample, which can be determined by the nitrogen content. Thus, the determination of nitrogen is important in providing useful information to the nutritional market. The carbon-to-hydrogen ratio is desirable in the characterization of coal and coke samples, as are the carbon, hydrogen, and nitrogen ratios in a variety of other organic materials. Thus, elemental analyzers have been in use for these and other applications for some time.

In present elemental analyzers, a combustion or reduction furnace may be provided for combusting or reducing a sample material such that the combustion gases produced thereby may be analyzed. One such analyzer system is described in U.S. Pat. No. 7,070,738, assigned to the present assignee, the disclosure of which is incorporated herein by reference. U.S. Pat. Nos. 7,497,991; 4,622,009; 6,291,802; and 6,270,727 also disclose components of a combustion system. The disclosures of the '991, '009, '802, and '727 patents are also incorporated herein by reference.

Dosing devices have been used in more than one application. In one application, a gas doser is used to transfer a precise quantity of a known calibrant from a primary stream to a secondary stream as part of the calibration of a detection system in the secondary stream. Some designs have a single dose size for one-point calibration; others have two or more dose sizes for multi-point calibration.

In another application, the primary gas consists of at least a portion of the combustion gases evolving from the burn of a sample; gases that have been collected and equilibrated using a molar transfer device. The dosing device transfers a small representative aliquot from the primary gas stream to the secondary stream for further processing and analysis. Reagents in the secondary stream are consumed by processing the aliquot, so the dose size is made as small as possible to minimize the cost of analysis. However, the dose must be large enough for the instrument to achieve the specified detection limits for the most demanding applications. There may be one or more dose sizes so that the operator can select the size most suitable to the analysis needs. In one instrument having two dose sizes, the ratio of the two dose volumes is about 3:1, and the two doses transfer approximately 1/500 and 1/1500 the volume gas collected in the primary stream.

Dosing devices that transfer a repeatable quantity of gas from a primary stream into a secondary stream are common. The device is placed in a constant temperature environment, or a means is provided to accurately measure the device temperature. A valving means cycles a dose volume typically through three states: fill, equilibrate, and transfer. The equilibration state is important as it allows the primary gas contained in the fixed volume to stabilize at a desired temperature and pressure. By knowing the doser volume, temperature, and pressure the precise molar quantity of gas is known. If two or more dose volumes are used, additional valving means is necessary to select between the dose sizes.

For high precision dosing, the valving paths must have low dead-volumes, and the device should actuate multiple valves simultaneously. If two-way valves are used to accomplish the transfer of gas, a bank of eight such valves is needed and there would likely be substantial dead volume. Alternately, four three-way valves can provide the same operation with lower dead volume but require an additional two-way valve to disable the primary stream for equilibration. If multiple dose sizes exist, only one dose volume is used at any time.

One such design uses a stem valve whose construction essentially has multiple three-way valves situated on the same stem. The stem is moved between two positions actuating all valves simultaneously between two states: fill and transfer. For two dose sizes, another similar stem valve is used to select one or the other. The valve body has eight external ports that extend to the internal stem chamber. Multiple O-rings are installed on the stem and the O-rings must pass by the ports when the stem is actuated so the ports must have smooth edges so they do not slice the O-rings. The stem diameter is made as small as possible to minimize dead volumes, making it challenging to manufacture. The external and internal connections create multiple potential leak points making it difficult to trouble-shoot the valve.

SUMMARY OF THE INVENTION

The disclosed invention solves the problem of quickly transferring a sequence of precise molar quantities of gas from a primary stream into a secondary stream with a simple device that is easy to manufacture and operate, has essentially zero dead-volume, and fewer leak points. The rotary dosing device comprises a rotating chamber, a valve body, two end caps, two end seals, and a motor. The rotating chamber has at least two internal dosing ports, which serve as the dose volumes. As the cylinder is rotated, the dose volumes are cycled through two or three states: fill, equilibrate (optional), and transfer. The device cycles in an overlapping manner such that as one dose volume fills with gas from the primary stream, another equilibrates at a known pressure and temperature, and another transfers its contents to the secondary stream.

The rotating chamber can be actuated multiple times during a single analysis to dose a variable but precise quantity of primary gas into the secondary stream. For example, the doser can be actuated a single time for one analysis, and three times for the next analysis to generate data for two points on a calibration curve. Multiple doses can also provide flexibility in a combustion application allowing the operator to more closely match the aliquot quantity with the analysis requirements.

An aspect of the present invention is to provide a rotary dosing device comprising a valve body and a rotating cylindrical chamber contained in the valve body. The rotating cylindrical chamber having an axial length and comprising: a first dosing port extending through the rotating cylindrical chamber, and a second dosing port extending through the rotating cylindrical chamber. The rotary dosing device further comprising: a primary upstream port for receiving a primary gas stream and introducing the primary gas stream into one of the first and second dosing ports of the rotating cylindrical chamber; a secondary upstream port for receiving a secondary gas stream and introducing the secondary gas stream into one of the first and second dosing ports of the rotating cylindrical chamber; a primary downstream port for receiving a remaining portion of the primary gas stream from one of the first and second dosing ports of the rotating cylindrical chamber; a secondary downstream port for receiving the secondary gas stream from one of the first and second dosing ports of the rotating cylindrical chamber; and a motor for rotating the rotating cylindrical chamber so that each of the first and second dosing ports sequentially aligns with the primary upstream and downstream ports for filling with the primary gas stream and the secondary upstream and downstream ports for transferring the gas to the secondary gas stream.

Another aspect is to provide a method of transferring a precise quantity of a known calibrant from a primary stream to a secondary stream to calibrate a detection system in the secondary stream. The method comprises using the rotary dosing device described herein whereby the known calibrant is introduced to the primary upstream port and a dose of the calibrant is transferred to the secondary stream via the secondary downstream port.

Another aspect is to provide a method of transferring a precise quantity of a small representative aliquot from a primary gas stream including to a secondary stream for further processing and analysis, the primary gas stream including at least a portion of combustion gases evolving from a burn of a sample to be analyzed. The method comprises using the rotary dosing device described herein whereby the primary gas stream is introduced to the primary upstream port and a precise quantity of the aliquot is transferred to the secondary stream via the secondary downstream port.

Another aspect of the present invention is to provide a rotary dosing device comprising: a valve body; and a rotating cylindrical chamber contained in the valve body. The rotating cylindrical chamber having an axial length and comprising: an upstream end face and a downstream end face on an opposite side of the rotating cylindrical chamber; a first dosing port extending from the upstream end face to the downstream end face, a second dosing port extending from the upstream end face to the downstream end face, and a third dosing port extending from the upstream end face to the downstream end face. The rotary dosing device further comprising: a primary upstream port for receiving a primary gas stream and introducing the primary gas stream into one of the first, second, and third dosing ports of the rotating cylindrical chamber; a secondary upstream port for receiving a secondary gas stream and introducing the secondary gas stream into one of the first, second, and third dosing ports of the rotating cylindrical chamber; a primary downstream port for receiving a remaining portion of the primary gas stream from one of the first, second, and third dosing ports of the rotating cylindrical chamber; a secondary downstream port for receiving the secondary gas stream from one of the first, second, and third dosing ports of the rotating cylindrical chamber; an equilibrate port; and a motor for rotating the rotating cylindrical chamber so that each of the first, second, and third dosing ports sequentially aligns with the primary upstream and downstream ports for filling with the primary gas stream, the equilibrate port for equilibrating the gas from the primary gas stream, and the secondary upstream and downstream ports for transferring the gas to the secondary gas stream.

These and other features, objects and advantages of the present invention will become apparent upon reading the following description thereof together with reference to the accompanying drawings.

DETAILED DESCRIPTION OF THE EMBODIMENTS

Figure 1:
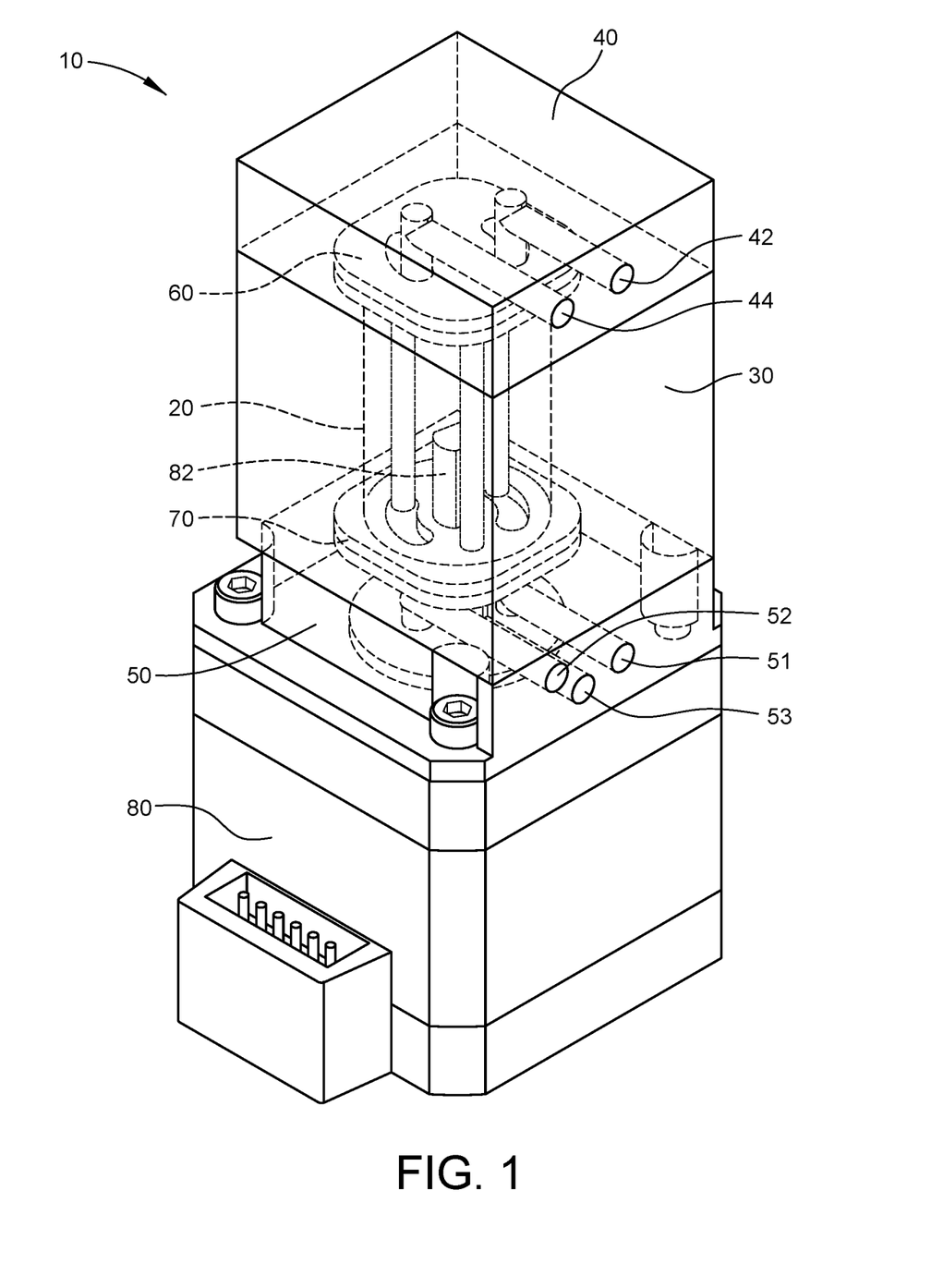
FIG. 1 is an isometric view of a rotary dosing device.
Figure 7A:
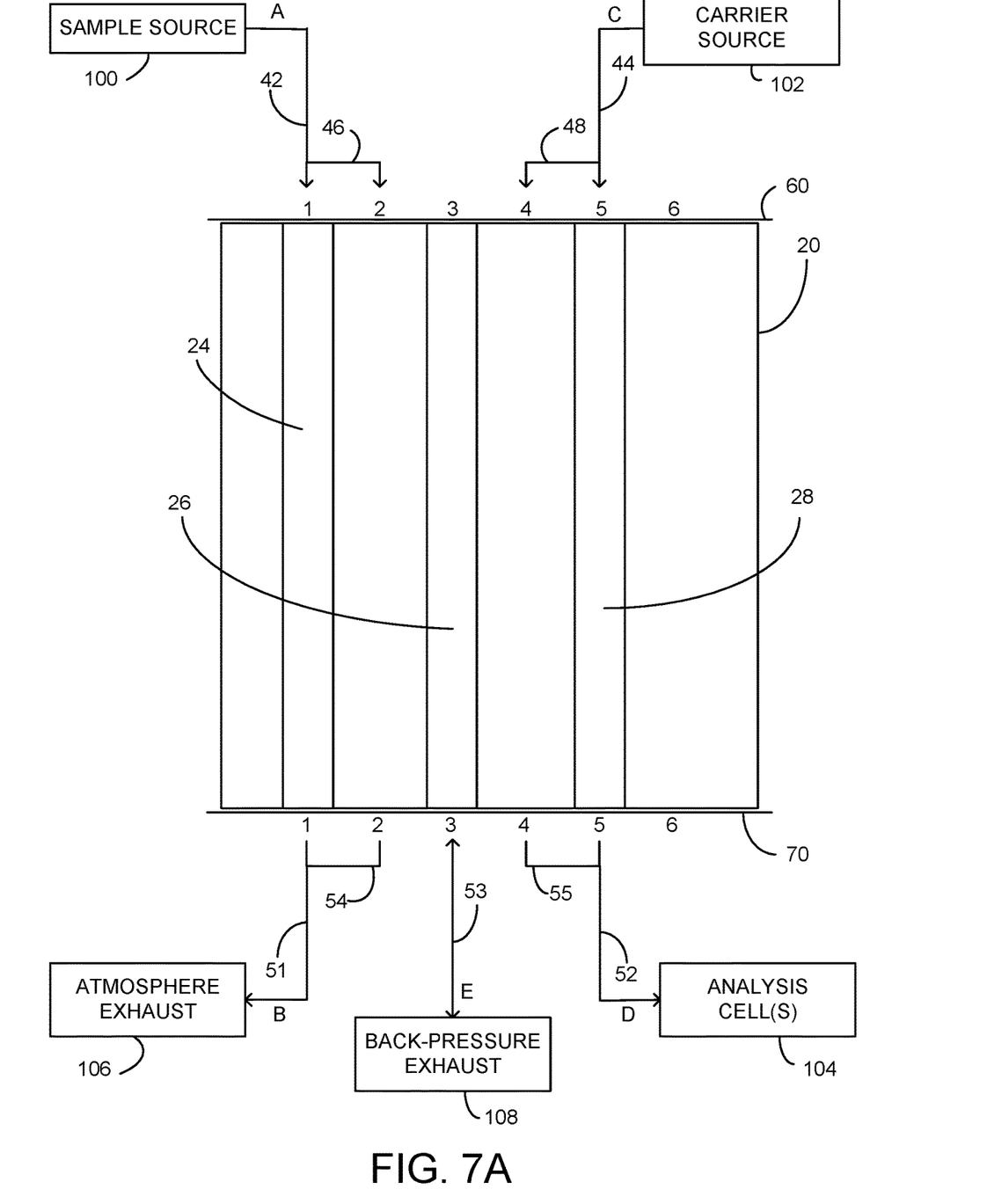
FIG. 7A is a schematic diagram of the rotary dosing device shown in FIG. 1 with dosing ports of the rotating chamber in a first normal set of positions.

Referring initially to FIG. 1, there is shown a rotary dosing device 10 having a rotating cylindrical chamber 20, a valve body 30, an upstream end cap 40, a downstream end cap 50, an upstream end seal 60, a downstream end seal 70, and a motor 80. As best shown in FIG. 7A, five gas paths connect to the device 10: a primary upstream path A, a primary downstream path B, a secondary upstream path C, a secondary downstream path D, and a downstream equilibration path E.

Figure 4:
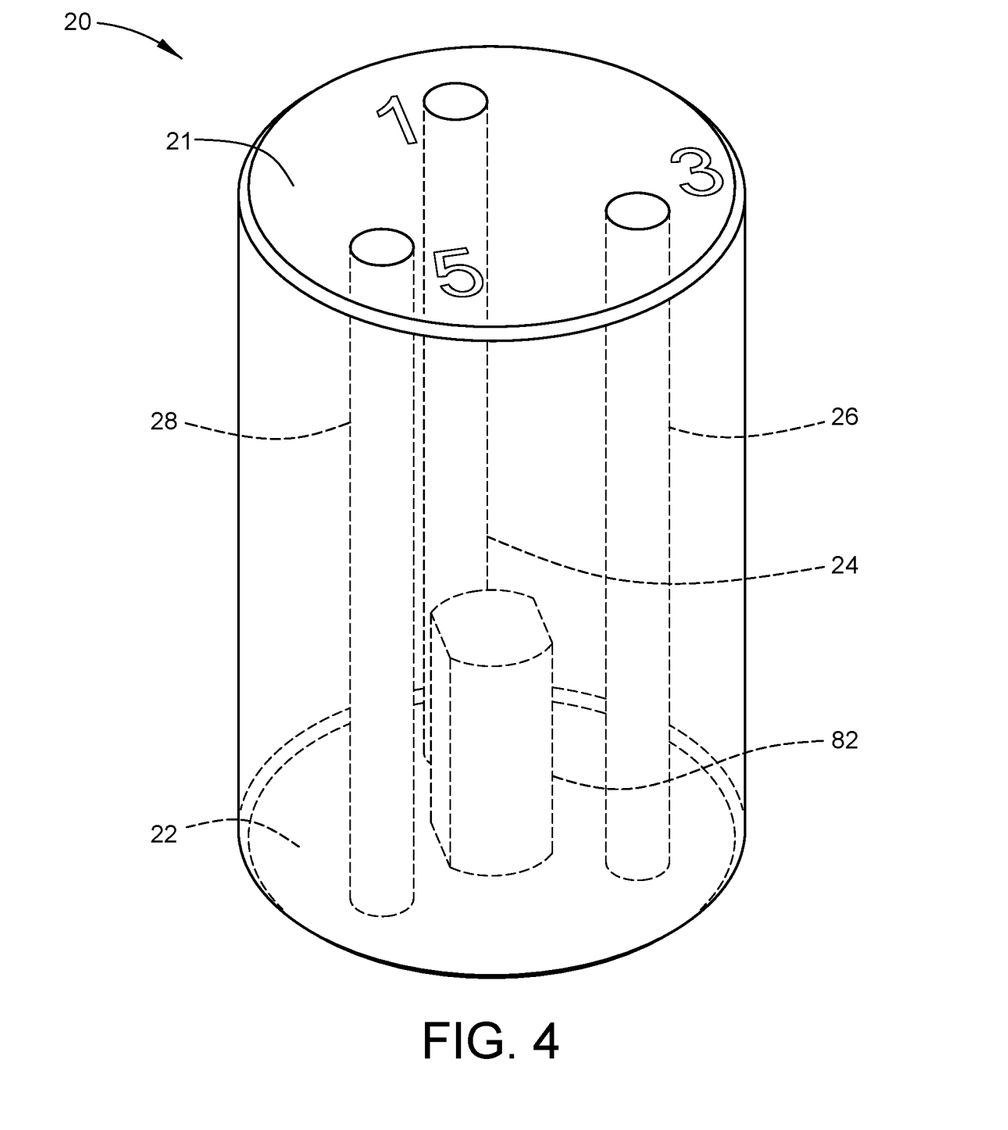
FIG. 4 is an isometric view of a rotating chamber used in the rotary dosing device shown in FIG. 1.
Figure 5:
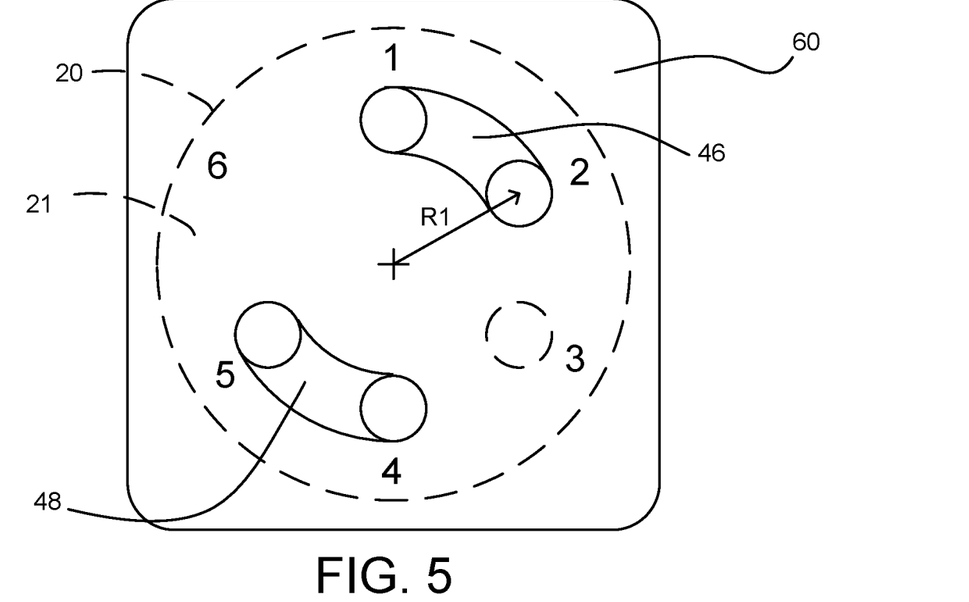
FIG. 5 is a top view of an upstream end seal used in the rotary dosing device shown in FIG. 1.

As best shown in FIG. 4, the rotating cylindrical chamber 20 has flat end faces 21 and 22 perpendicular to the cylinder's axis of rotation including an upstream end face 21 and a downstream end face 22. In the example shown, three equal-volume dosing ports 24, 26, and 28 extend the length of the chamber 20 to both end faces 21 and 22 and serve as the internal dose volumes of the device 10. It should be noted, however, that the dosing ports 24, 26, and 28 may have different volumes to allow different sized doses from each port. As shown in FIG. 5, the dosing ports 24, 26, and 28 are located at a fixed radius R1 from the center of the end faces 21 and 22, and arranged 120° from each other. Although three dosing ports 24, 26, and 28 are shown in the disclosed example, only two dosing ports are needed and additional dosing ports may be provided. Such additional dosing ports could be provided for various reasons. For example, if additional equilibration time is desired, there may be additional dosing ports and additional equilibrate positions provided between the fill and transfer positions. There could also be additional ports and positions simply to await filling. Although the dosing ports 24, 26, and 28 are shown as extending parallel to the axis of the rotating cylindrical chamber 20, the dosing ports may extend at an angle to this axis or may enter and/or exit the chamber 20 on the curved sidewalls of the chamber 20.

Referring back to FIG. 1, the valve body 30 has a large cylindrical bore to receive the rotating cylindrical chamber 20 and bearings (not shown) to constrain the chamber 20 radially while allowing it to rotate freely. The upstream cap 40 and the downstream cap 50 fasten to the valve body 30 and axially retain the rotating cylindrical chamber 20.

Figure 2:
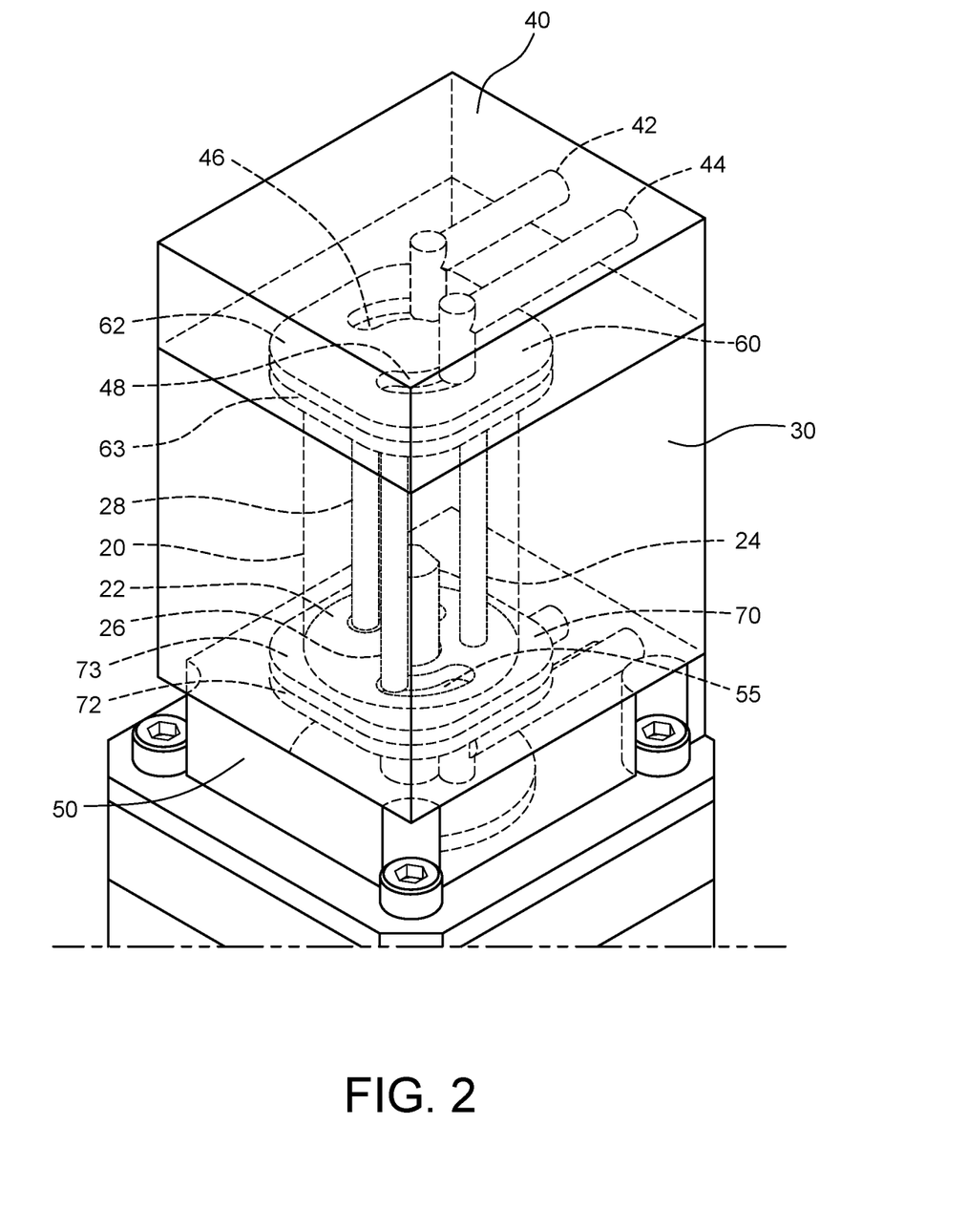
FIG. 2 is an enlarged isometric view of an upstream portion of the rotary dosing device shown in FIG. 1.
Figure 3:
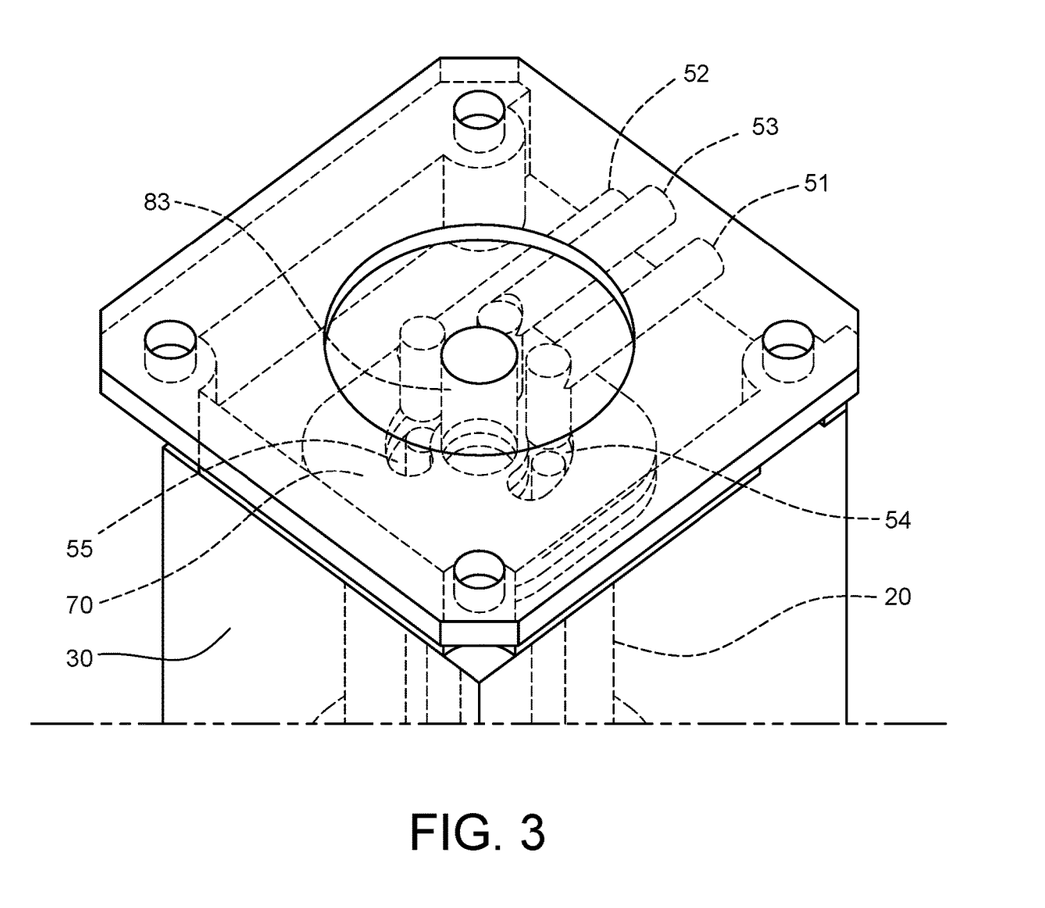
FIG. 3 is an enlarged isometric view of a downstream portion of the rotary dosing device shown in FIG. 1.

The upstream end seal 60 is located between the upstream end cap 40 and the upstream end face 21. The downstream end seal 70 is located between the downstream end cap 50 and the downstream end face 22. As best shown in FIG. 2, the seals 60 and 70 are preferably composed of two materials: an elastomer material 62, 72 that is in contact with the caps 40 and 50; and a low-friction material 63, 73 such as PTFE or other that is in contact with the rotational end faces 21, 22 of the chamber 20. The elastomer material 62, 72 provides a spring force to keep the low-friction sealing surface pressed against the end faces 21 and 22. The seals 60 and 70 are retained in the caps 40 and 50 so that they do not rotate when the chamber 20 rotates.

Figure 6:
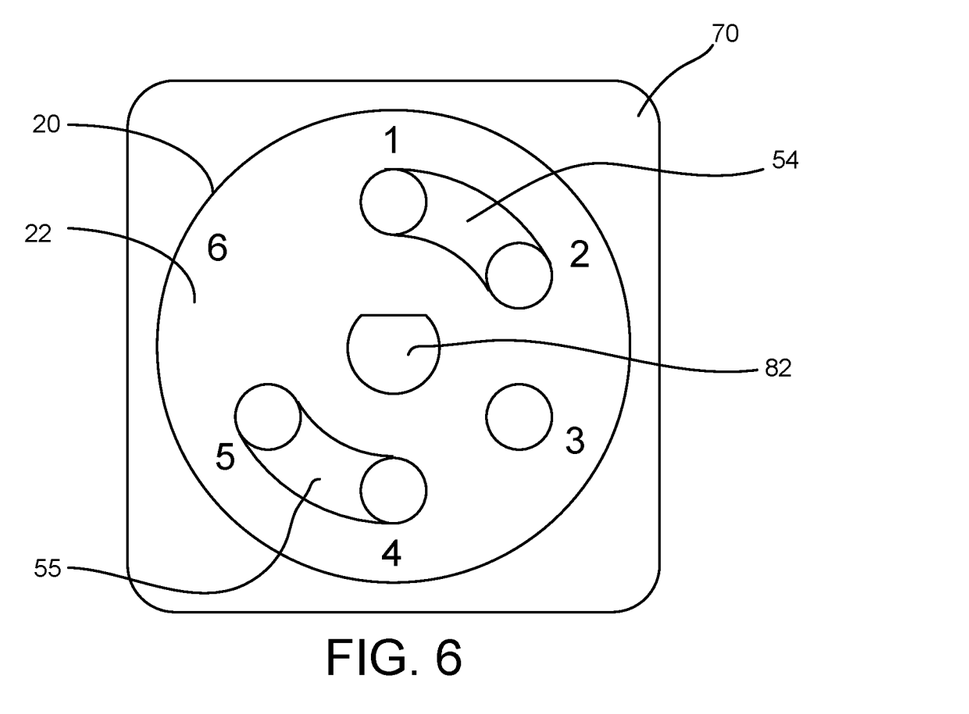
FIG. 6 is a top view of a downstream end seal used in the rotary dosing device shown in FIG. 1.

As viewed from the upstream cap 40 looking at the upstream seal 60 and the upstream end face 21 (FIG. 5), six positions are defined referenced to the chamber's axis of rotation. These positions are arranged 60° apart, all at radius R1; the selection of the 0° position is arbitrary. The six positions are labeled 1-6 in a clockwise fashion. FIG. 6 shows the positions on the downstream seal 70 looking from the upstream end.

As shown in FIGS. 1, 2, and 7A-7D, a primary upstream port 42 on the exterior of the upstream cap 40 connects to the upstream primary path A and a secondary upstream port 44 connects to the upstream secondary path C. These two ports 42 and 44 extend internally to interface with the dosing ports 24, 26, and 28. The primary upstream port 42 occupies position 1, and the secondary upstream port 44 occupies position 5. Upstream grooved paths 46 and 48 in the internal surface of the upstream cap 40 allow the valve to operate in two positions: start-up and normal as described further below. On the upstream cap 40, a first upstream grooved path 46 extends between positions 1 and 2, and the second upstream grooved path 48 extends between positions 4 and 5.

As shown in FIGS. 1, 3, and 7A-7D, the downstream cap 50 has three downstream ports 51, 52, and 53. A primary downstream port 51 connects externally to the primary downstream path B, a secondary downstream port 52 connects to the secondary downstream path D, and an equilibration downstream port 53 connects to the equilibration downstream path E. These three downstream ports 51, 52, and 53 extend internally to interface with any of the dosing ports 24, 26, and 28. The primary downstream port 51 occupies position 1, the secondary downstream port 52 occupies position 5, and the equilibration port 53 occupies position 3. There are two downstream grooved paths 54 and 55 in the internal surface of the downstream cap 50: a first downstream grooved path 54 extends between positions 1 and 2, and a second downstream grooved path 55 extends between positions 4 and 5. The equilibrate port 53 may be eliminated if equilibration using a back pressure is not desired.

There are paths in the end seals 60 and 70 that align with the ports and grooved paths in the caps 40 and 50.

The end faces 21 and 22 are finished so as to inflict minimal wear on the sealing surface they rotate against.

There is a feature 82 in the center of the downstream end face 22 having a non-circular shape such that it can be engaged by a similarly shaped mating coupling on a shaft of the motor 80 to rotate the chamber 20. The motor 80 may be a stepper motor that is fastened to the downstream cap 50 and a feature on the motor shaft passes through an opening 83 in the downstream cap 50 and downstream seal 70 engages the mating feature 82 on the chamber face 22 to rotate the chamber 20.

Under normal conditions, the internal dosing ports 24, 26, and 28 align with positions 1, 3, and 5 on the caps 40 and 50 and end seals 60 and 70 as shown in FIG. 7A: position 1 is filling, position 3 is equilibrating, and position 5 is transferring. In the example shown in FIG. 7A, the first dosing port 24 is aligned in position 1 in communication with the ports 42 and 51 for filling the first dosing port 24 with gas from the upstream primary gas stream A while excess gas flows to the downstream primary gas stream B, which may be atmosphere exhaust 106. The second dosing port 26 is aligned in position 3 for communication with equilibrate port 53 for equilibrating at a particular pressure which may be established by the back-pressure exhaust gas stream E. The third dosing port 28 is aligned in position 5 in communication with the ports 44 and 52 in order to allow the upstream secondary gas stream C to flow through the third dosing port 28 into the downstream secondary gas stream D. The chamber 20 is then rotated 120° per cycle in a clockwise fashion as described further below.

Figure 7B:
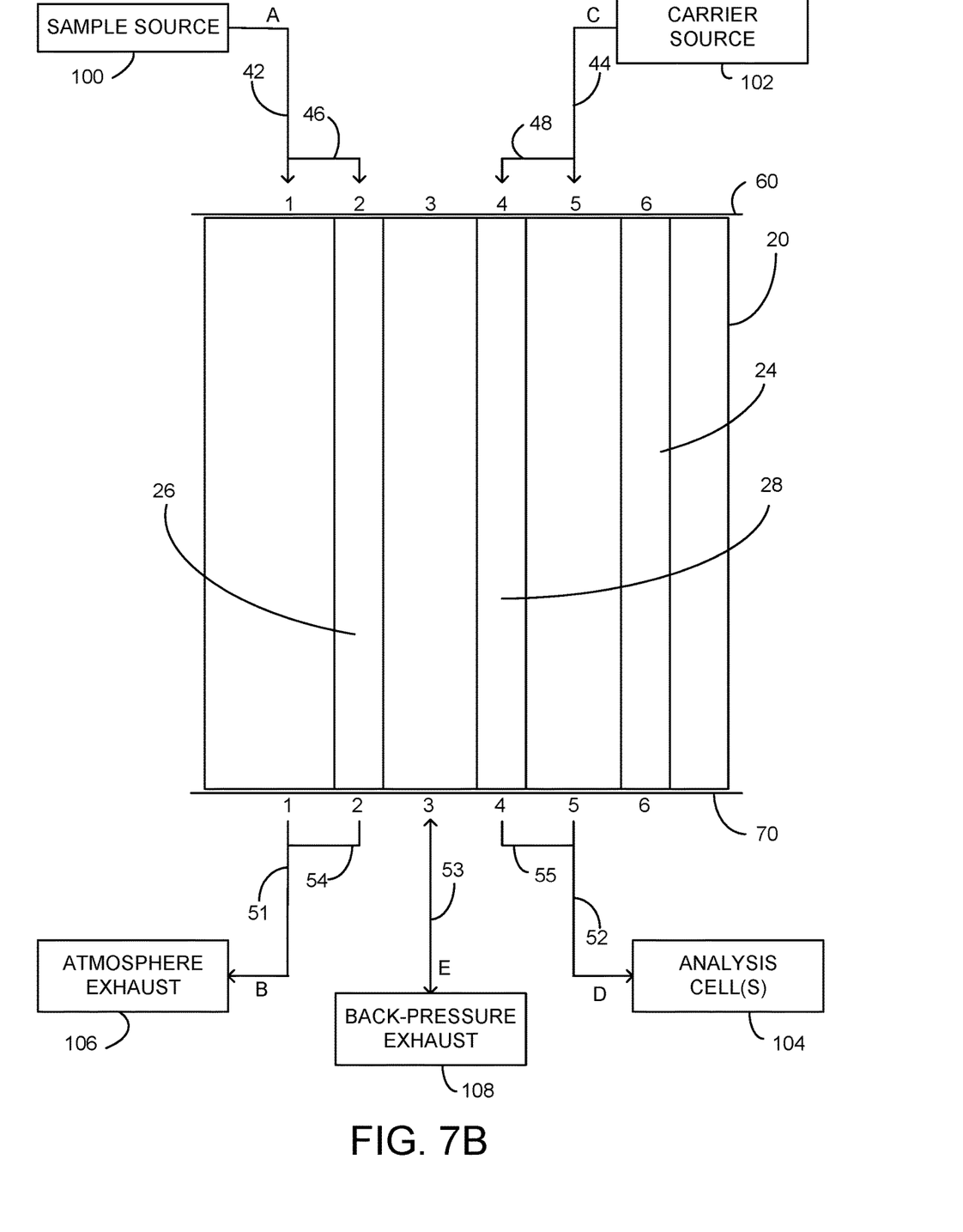
FIG. 7B is a schematic diagram of the rotary dosing device shown in FIG. 1 with dosing ports of the rotating chamber in an intermediate set of positions.
Figure 7C:
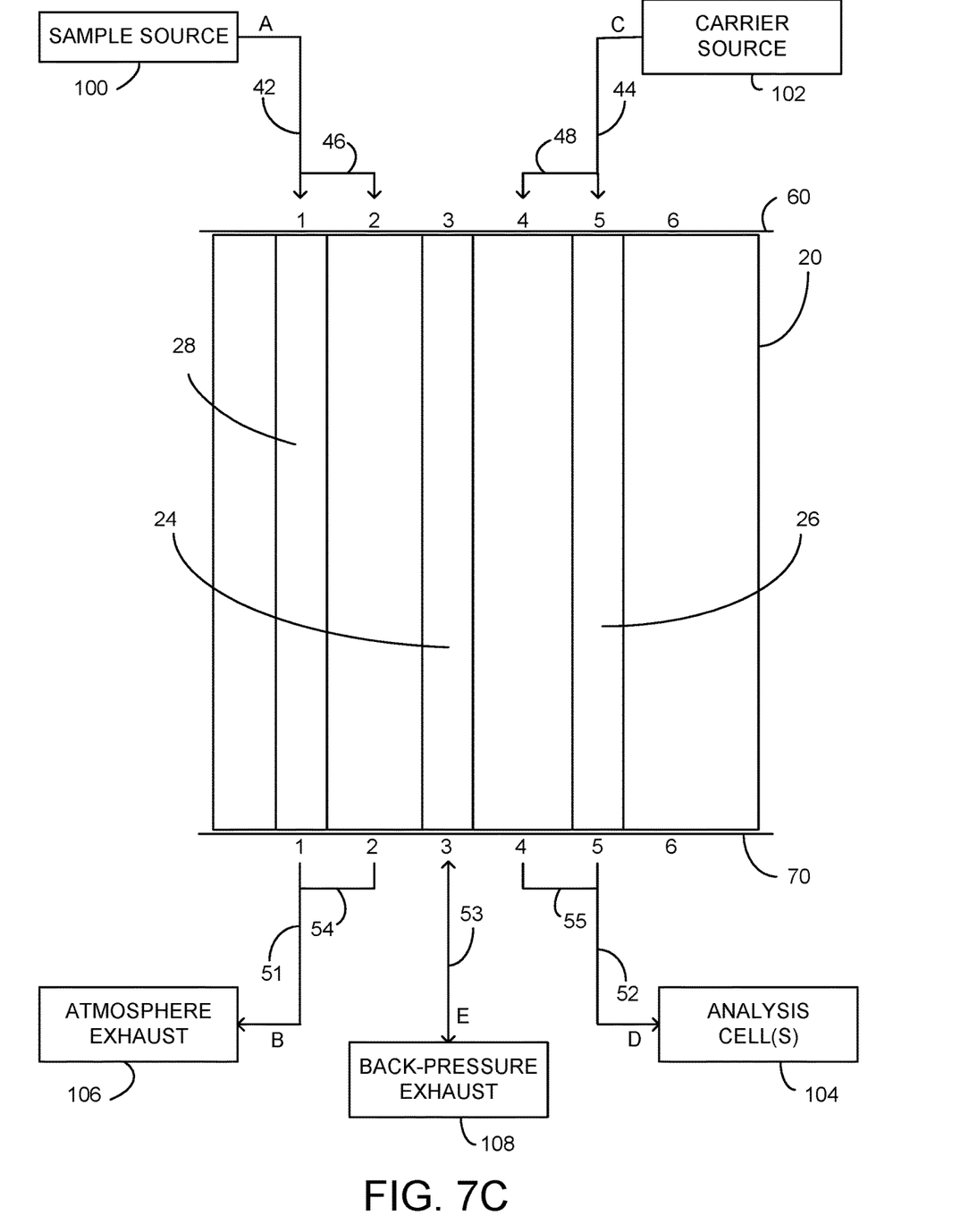
FIG. 7C is a schematic diagram of the rotary dosing device shown in FIG. 1 with dosing ports of the rotating chamber in a second normal set of positions.
Figure 7D:
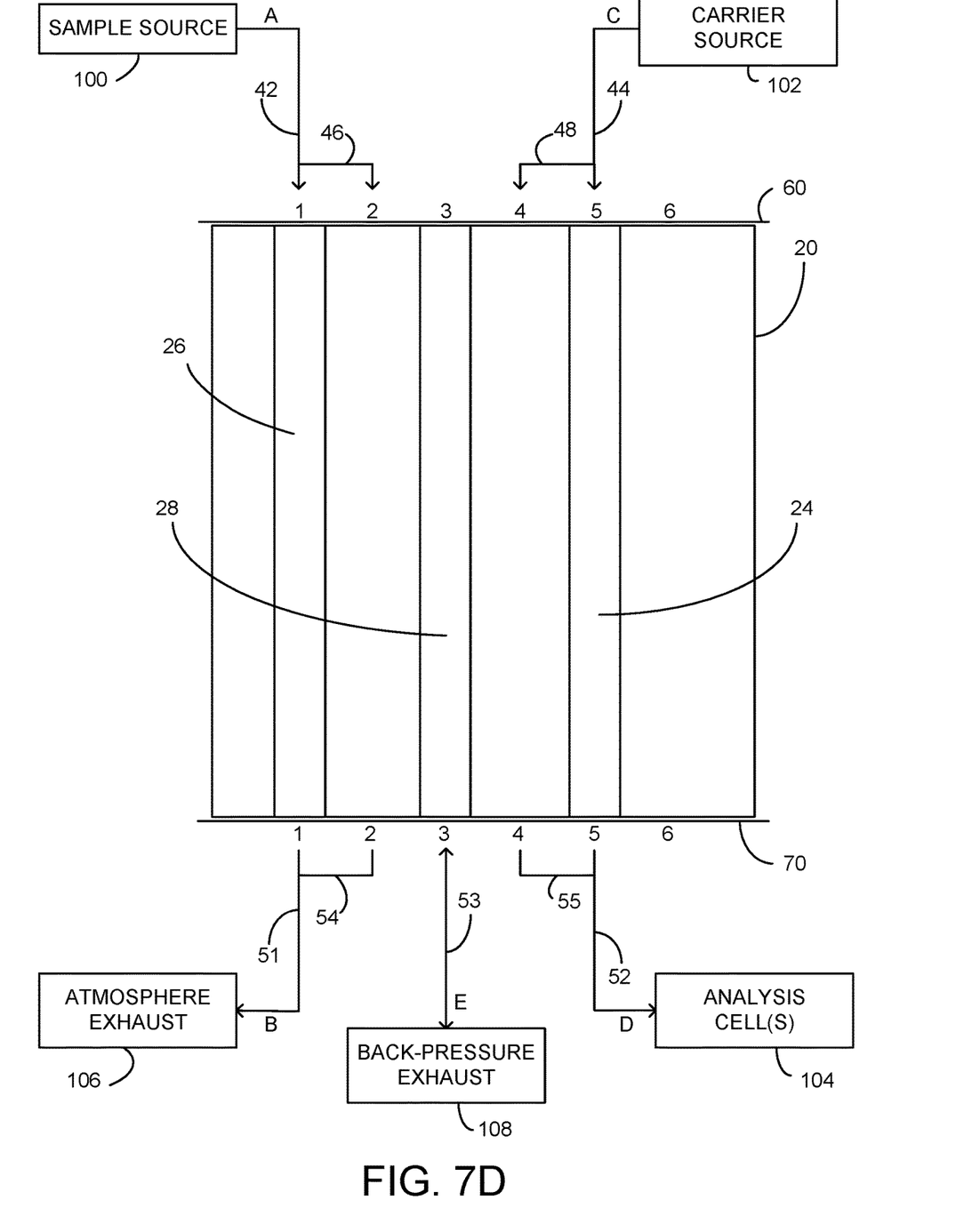
FIG. 7D is a schematic diagram of the rotary dosing device shown in FIG. 1 with dosing ports of the rotating chamber in a third normal set of positions.

However, for the first transfer, it is not desirable to start out by advancing the chamber 20 clockwise 120° because the gas in the dosing port that is in the equilibrate position 3 (the second dosing port 26), is unknown so transferring to the secondary gas stream D is undesirable. For this reason, at start-up the chamber 20 is rotated counter-clockwise 60° to an intermediate position so that its dosing ports 24, 26, and 28 align with positions 2, 4, and 6. The grooved channels 46, 48, 54, and 55 in the end caps 40 and 50 and the end seals 60 and 70 extend the primary upstream and downstream paths A and B and the secondary upstream and downstream paths C and D to reach the intermediate positions 2 and 4. As shown in FIG. 7B, the second dosing port 26, which had been in the position 3, is now moved so as to be filled in position 2; the third dosing port 28, which had been in transfer position 5, is now still providing a flow path for the secondary gas stream in position 4; and the first dosing port 24, which had been filling in position 1 is now backed into a waiting position at position 6 with its input and output blocked off.

After filling the second dosing port 26, the chamber 20 advances clockwise 60° to the original starting position (FIG. 7A) to equilibrate the first dose contained in the second dosing port 26 in position 3. After that, the chamber 20 will advance 120° clockwise per cycle as normal. For example, moving from the position in FIG. 7A to the position shown in FIG. 7C, the second dosing port 26 is advanced from the equilibrate position 3 to the transfer position 5 in order to transfer the first dose to the downstream secondary stream D using carrier gas from the upstream secondary stream C, the first dosing port 24 is moved from the filling position 1 to the equilibrate position 3, and the third dosing port 28 is moved from the transfer position 5 to the filling position 1. Next, the chamber 20 will again advance 120° clockwise so that the chamber 20 rotates from the position in FIG. 7C to that in FIG. 7D wherein the first dosing port 24 is advanced from the equilibrate position 3 to the transfer position 5 in order to transfer the second dose to the downstream secondary gas stream D using carrier gas from a carrier source 102 via the upstream secondary gas stream C, the third dosing port 28 is moved from the filling position 1 to the equilibrate position 3, and the second dosing port 26 is moved from the transfer position 5 to the filling position 1. Next, the chamber 20 will again advance 120° clockwise so that the chamber 20 rotates from the position in FIG. 7D to the initial position in FIG. 7A whereby the third dose in the third dosing port 28 may be transferred to the secondary gas stream D.

The chamber 20 may continue to rotate and deliver doses to the secondary gas stream D. The number of rotations will depend on the molar dosage desired for the particular analysis. This rotary dosing device 10 thus allows for selection of any particular dosage that is an increment of a single dosage from one of dosing ports 24, 26, and 28. The rotating chamber 20 can be actuated multiple times during a single analysis to dose a variable but precise quantity of primary gas into the secondary gas stream. For example, the rotating dosing device 10 can be actuated a single time for one analysis, and three times for the next analysis to generate data for two points on a calibration curve. Multiple doses can also provide flexibility in a combustion application allowing the operator to more closely match the aliquot quantity with the analysis requirements.

The rotary dosing device 10 is capable of quickly transferring a sequence of precise molar quantities of gas from the primary gas stream into the secondary gas stream. The rotary dosing device 10 is a simple device that is easy to manufacture and operate, has essentially zero dead-volume, and fewer leak points.

The rotary dosing device 10 may be used in a method of transferring a precise quantity of a known calibrant from a primary gas stream to a secondary gas stream to calibrate a detection system in the secondary gas stream. The method comprises using the rotary dosing device 10 described herein whereby the known calibrant is introduced to the primary upstream port 42 and a dose of the calibrant is transferred to the secondary gas stream via the secondary downstream port 52. A size of the dose of calibrant may be varied to achieve multi-point calibration.

The rotary dosing device 10 may also be used in a method of transferring a precise quantity of a small representative aliquot from a primary gas stream including to a secondary stream for further processing and analysis, the primary gas stream including at least a portion of combustion gases evolving from a burn of a sample to be analyzed. The method comprises using the rotary dosing device 10 described herein whereby the primary gas stream is introduced to the primary upstream port 42 and a precise quantity of the aliquot is transferred to the secondary stream via the secondary downstream port 52. A size of the dose of aliquot is variable.

The rotary dosing device 10 is thus well suited for use in an elemental analyzer, which comprises a sample source 100 for providing a gas sample into the primary gas stream A received at the primary upstream port 42 of the rotary dosing device 10. The sample source 100 may be a combustion furnace. Examples of components of suitable combustion furnaces are disclosed in U.S. Pat. Nos. 7,497,991; 4,622,009; 6,291,802; and 6,270,727. The disclosures of the '991, '009, '802, and '727 patents are incorporated herein by reference. The elemental analyzer may also include a carrier source 102 for providing a carrier gas in the secondary gas stream C received at the secondary upstream port 44 of the rotary dosing device 10. The elemental analyzer may further include at least one analysis cell 104 for receiving the secondary gas stream D from the secondary downstream port 52, and for analyzing the received secondary gas stream D in which the gas sample is introduced by the rotary dosing device 10. In addition, the elemental analyzer may include an atmosphere exhaust 106 for exhausting to atmosphere the primary gas stream B received from primary downstream port 51, and a back-pressure exhaust 108 coupled to equilibrate port 53 for bringing the dose in the dosing port connected to equilibrate port 53 to the desired pressure.

It will become apparent to those skilled in the art that, given the teaching of this specification, multiple bidirectional or unidirectional ballasts may be employed to achieve the improved performance of an analyzer. It will also be apparent to those skilled in the art that these and other modifications can be made without departing from the spirit or scope of the invention as defined by the appended claims.

The invention claimed is:

1. A rotary dosing device comprising:
a valve body;
a rotating cylinder contained in the valve body, the rotating cylinder having an axial length and comprising:
a first dosing port extending through the rotating cylinder,
a second dosing port extending through the rotating cylinder, and
a third dosing port extending through the rotating cylinder;
a primary upstream port for receiving a primary gas stream and introducing the primary gas stream into one of the first and second dosing ports of the rotating cylinder;
a secondary upstream port for receiving a secondary gas stream and introducing the secondary gas stream into one of the first and second dosing ports of the rotating cylinder;
a primary downstream port for receiving the primary gas stream from one of the first and second dosing ports of the rotating cylinder;
a secondary downstream port for receiving the secondary gas stream from one of the first and second dosing ports of the rotating cylinder, wherein the primary upstream and downstream ports and the secondary upstream and downstream ports selectively connect to the third dosing port;
an equilibrate port; and
a motor for rotating the rotating cylinder so that each of the first and second dosing ports sequentially aligns with: the primary upstream and downstream ports for filling with the primary gas stream, and the secondary upstream and downstream ports for transferring the gas to the secondary gas stream,
wherein the motor rotates the rotating cylinder so that each of the first, second, and third dosing ports sequentially aligns with: the primary upstream and downstream ports for filling with the primary gas stream, the equilibrate port for equilibrating the gas from the primary gas stream, and the secondary upstream and downstream ports for transferring the gas to the secondary gas stream.

2. The rotary dosing device as defined in claim 1, wherein, when the second dosing port is aligned with the primary upstream and downstream ports for filling with the primary gas stream, the first dosing port is simultaneously aligned with the equilibrate port for equilibrating the gas from the primary gas stream.

3. The rotary dosing device as defined in claim 1, wherein, when the third dosing port is aligned with the primary upstream and downstream ports for filling with the primary gas stream, the second dosing port is simultaneously aligned with the equilibrate port for equilibrating the gas from the primary gas stream and the first dosing port is simultaneously aligned with the secondary upstream and downstream ports for transferring the gas into the secondary gas stream.

4. The rotary dosing device as defined in claim 1 and further comprising:
an upstream end cap secured to an upstream end of the valve body; and
a downstream end cap secured to a downstream end of the valve body, wherein the primary upstream port and the secondary upstream port are provided in the upstream end cap, and wherein the primary downstream port, the secondary downstream port, and the equilibrate port are provided in the downstream end cap.

5. The rotary dosing device as defined in claim 4 and further comprising:
an upstream end seal positioned between the upstream end cap and an upstream end face of the rotating cylinder; and
a downstream end seal positioned between the downstream end cap and a downstream end face of the rotating cylinder.

6. The rotary dosing device as defined in claim 5, wherein:
the upstream end seal having an opening in communication with the primary upstream port and an opening in communication with the secondary upstream port, and
the downstream end seal having an opening in communication with the primary downstream port, an opening in communication with the secondary downstream port, and one opening in communication with the equilibrate port.

7. The rotary dosing device as defined in claim 6, wherein the motor is configured to rotate the rotating cylinder in an intermediate position where one of the first, second, and third dosing ports is aligned with the equilibrate port, another is aligned with the secondary upstream and downstream ports, and the other is aligned with none of the primary upstream and downstream ports, the secondary upstream and downstream ports, and the equilibrate port.

8. The rotary dosing device as defined in claim 1, wherein the rotating cylinder includes an upstream end face and a downstream end face on an opposite side of the rotating cylinder, wherein the first and second dosing ports both extend from the upstream end face to the downstream end face.

9. A method of transferring a precise quantity of a known calibrant from a primary stream to a secondary stream to calibrate a detection system in the secondary stream, the method comprising:
using the rotary dosing device of claim 1 whereby the known calibrant is introduced to the primary upstream port and a dose of the calibrant is transferred to the secondary stream via the secondary downstream port.

10. The method of claim 9, wherein a size of the dose of calibrant may be varied to achieve multi-point calibration.

11. A method of transferring a precise quantity of a small representative aliquot from a primary gas stream including to a secondary stream for further processing and analysis, the primary gas stream including at least a portion of combustion gases evolving from a burn of a sample to be analyzed, the method comprising:
using the rotary dosing device of claim 1 whereby the primary gas stream is introduced to the primary upstream port and a precise quantity of the aliquot is transferred to the secondary stream via the secondary downstream port.

12. The method of claim 11, wherein a size of the dose of aliquot is variable.

13. An elemental analyzer for analyzing elements of a gas sample, the elemental analyzer comprising:
the rotary dosing device of claim 1;
a sample source for providing a gas sample into the primary gas stream received at the primary upstream port of the rotary dosing device;
a carrier source for providing a carrier gas in the secondary gas stream received at the secondary upstream port of the rotary dosing device;
an analysis cell for receiving the secondary gas stream from the secondary downstream port, and for analyzing the received secondary gas stream in which the gas sample is introduced by the rotary dosing device.

14. A rotary dosing device comprising:
a valve body;
a rotating cylinder contained in the valve body, the rotating cylinder having an axial length and comprising:
an upstream end face and a downstream end face on an opposite side of the rotating cylinder;
a first dosing port extending from the upstream end face to the downstream end face,
a second dosing port extending from the upstream end face to the downstream end face, and
a third dosing port extending from the upstream end face to the downstream end face;
a primary upstream port for receiving a primary gas stream and introducing the primary gas stream into one of the first, second, and third dosing ports of the rotating cylinder;
a secondary upstream port for receiving a secondary gas stream and introducing the secondary gas stream into one of the first, second, and third dosing ports of the rotating cylinder;
a primary downstream port for receiving the primary gas stream from one of the first, second, and third dosing ports of the rotating cylinder;
a secondary downstream port for receiving the secondary gas stream from one of the first, second, and third dosing ports of the rotating cylinder;
an equilibrate port; and
a motor for rotating the rotating cylinder so that each of the first, second, and third dosing ports sequentially aligns with: the primary upstream and downstream ports for filling with the primary gas stream, the equilibrate port for equilibrating the gas from the primary gas stream, and the secondary upstream and downstream ports for transferring the gas to the secondary gas stream.

15. The rotary dosing device as defined in claim 14, wherein, when the second dosing port is aligned with the primary upstream and downstream ports for filling with the primary gas stream, the first dosing port is simultaneously aligned with the equilibrate port for equilibrating the gas from the primary gas stream.

16. The rotary dosing device as defined in claim 14, wherein, when the third dosing port is aligned with the primary upstream and downstream ports for filling with the primary gas stream, the second dosing port is simultaneously aligned with the equilibrate port for equilibrating the gas from the primary gas stream and the first dosing port is simultaneously aligned with the secondary upstream and downstream ports for transferring the gas into the secondary gas stream.

17. The rotary dosing device as defined in claim 14 and further comprising:
   an upstream end cap secured to an upstream end of the valve body; and
   a downstream end cap secured to a downstream end of the valve body,
   wherein the primary upstream port and the secondary upstream port are provided in the upstream end cap, and wherein the primary downstream port, the secondary downstream port, and the equilibrate port are provided in the downstream end cap.

18. The rotary dosing device as defined in claim 17 and further comprising:
   an upstream end seal positioned between the upstream end cap and the upstream end face of the rotating cylinder; and
   a downstream end seal positioned between the downstream end cap and the downstream end face of the rotating cylinder.

19. The rotary dosing device as defined in claim 18, wherein:
   the upstream end seal having an opening in communication with the primary upstream port and an opening in communication with the secondary upstream port, and
   the downstream end seal having an opening in communication with the primary downstream port, an opening in communication with the secondary downstream port, and one opening in communication with the equilibrate port.

20. The rotary dosing device as defined in claim 19, wherein the motor is configured to rotate the rotating cylinder in an intermediate position where one of the first, second, and third dosing ports is aligned with the equilibrate port, another is aligned with the secondary upstream and downstream ports, and the other is aligned with none of the primary upstream and downstream ports, the secondary upstream and downstream ports, and the equilibrate port.

21. An elemental analyzer for analyzing elements of a gas sample, the elemental analyzer comprising:
   the rotary dosing device of claim 14;
   a sample source for providing a gas sample into the primary gas stream received at the primary upstream port of the rotary dosing device;
   a carrier source for providing a carrier gas in the secondary gas stream received at the secondary upstream port of the rotary dosing device; and
   an analysis cell for receiving the secondary gas stream from the secondary downstream port, and for analyzing the received secondary gas stream in which the gas sample is introduced by the rotary dosing device.

* * * * *